(12) United States Patent
Hashimoto et al.

(10) Patent No.: US 8,403,790 B2
(45) Date of Patent: Mar. 26, 2013

(54) MOTOR TRANSMISSION APPARATUS

(75) Inventors: Takenori Hashimoto, Tokyo (JP); Atsushi Namba, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 321 days.

(21) Appl. No.: 12/944,201

(22) Filed: Nov. 11, 2010

(65) Prior Publication Data
US 2011/0118072 A1  May 19, 2011

(30) Foreign Application Priority Data

Nov. 13, 2009  (JP) ................. 2009-259734

(51) Int. Cl.
| F16H 3/72 | (2006.01) |
| F16H 37/06 | (2006.01) |
| F16H 31/00 | (2006.01) |
| B60W 10/02 | (2006.01) |
| B60W 10/08 | (2006.01) |
| B60W 10/04 | (2006.01) |
| B60W 10/00 | (2006.01) |
| H02P 15/00 | (2006.01) |
| H02P 15/02 | (2006.01) |

(52) U.S. Cl. ............ 475/116; 475/4; 475/5; 475/8; 475/119; 475/120; 477/5; 477/6; 477/8; 477/9; 477/52; 477/70; 477/121; 192/87.15; 192/87.16; 192/87.18

(58) Field of Classification Search .......... 475/4, 5, 475/8, 116, 119, 120; 477/5, 6, 8, 9, 52, 477/70, 121–165; 192/87.15, 87.16, 87.18
See application file for complete search history.

(56) References Cited

U.S. PATENT DOCUMENTS

| 3,823,801 A * | 7/1974 | Arnold ................ 192/48.618 |
| 7,395,908 B2 * | 7/2008 | Hegerath et al. .......... 192/3.58 |
| 7,607,366 B2 * | 10/2009 | Hori et al. ................ 74/331 |

FOREIGN PATENT DOCUMENTS

JP  2007-270954 A  10/2007

* cited by examiner

Primary Examiner — Tisha Lewis
(74) Attorney, Agent, or Firm — McDermott Will & Emery LLP

(57) ABSTRACT

A motor transmission apparatus is provided between a transmission output shaft coupled to a drive wheel and a motor shaft coupled to a motor/generator. The motor transmission apparatus includes a first power transmission path that is switched to a power transmission condition by a high clutch having a clutch oil chamber, and a second power transmission path that is switched to a power transmission condition by a low brake having a brake oil chamber. Working oil discharged from an oil pump is guided to an oil passage switching valve via an output control valve. The working oil is distributed to one of the clutch oil chamber and the brake oil chamber by the oil passage switching valve, and therefore interlocking, in which the high clutch and the low brake are engaged simultaneously, can be avoided.

8 Claims, 8 Drawing Sheets

MOTOR TRANSMISSION APPARATUS

CROSS-REFERENCE TO RELATED APPLICATIONS

The present application claims priority from Japanese Patent Application No. 2009-259734, filed on Nov. 13, 2009, and is hereby incorporated by reference in its entirety.

BACKGROUND OF THE INVENTION

1. Field of the Invention

The present invention relates to a motor transmission apparatus provided between a drive shaft coupled to a drive wheel and a motor shaft coupled to a traction motor.

2. Description of the Related Art

A plurality of clutch mechanisms and brake mechanisms are incorporated into an automatic transmission or the like installed in a vehicle (see Japanese Patent Application Publication No. 2007-270954, for example). In these clutch mechanisms and brake mechanisms, engagement control must be performed while avoiding interlocking, in which gear trains having different gear ratios are engaged simultaneously.

Incidentally, in a hybrid vehicle that uses both an engine and a traction motor as drive sources or an electric automobile that uses a traction motor as a drive source, the traction motor must be prevented from over-speeding in order to suppress an induced voltage of the traction motor and thereby protect an inverter. By installing a transmission apparatus between the drive shaft and the traction motor, a rotation speed of the traction motor during high-speed travel can be reduced, and as a result, over-speeding can be prevented. The transmission apparatus for preventing over-speeding in the traction motor is also provided with a plurality of clutch mechanisms and brake mechanisms, and it is therefore important to employ a structure for preventing interlocking in the transmission apparatus.

SUMMARY OF THE INVENTION

An object of the present invention is to prevent interlocking in a motor transmission apparatus.

A motor transmission apparatus according to the present invention is provided between a drive shaft coupled to a drive wheel and a motor shaft coupled to a traction motor, and the motor transmission apparatus includes: a first engagement mechanism for switching a first power transmission path provided between the drive shaft and the motor shaft between a power transmission condition and a power blocking condition; a second engagement mechanism for switching a second power transmission path provided between the drive shaft and the motor shaft between a power transmission condition and a power blocking condition; an output control valve that is provided between an oil pressure supply source and the first and second engagement mechanisms, and is switched between a communicative condition in which working oil from the oil pressure supply source is allowed to pass through the output control valve and a blocking condition in which the working oil from the oil pressure supply source is blocked; and an oil passage switching valve that is provided between the output control valve and the first and second engagement mechanisms, and is switched between a condition in which working oil from the output control valve is guided to the first engagement mechanism and a state in which the working oil from the output control valve is guided to the second engagement mechanism.

In the motor transmission apparatus according to the present invention, the oil passage switching valve is switched by a pilot pressure from a solenoid valve.

In the motor transmission apparatus according to the present invention, the output control valve is switched by a pilot pressure from a solenoid valve.

In the motor transmission apparatus according to the present invention, the oil pressure supply source is an electric pump, and the output control valve is switched by working oil from the electric pump.

In the motor transmission apparatus according to the present invention, the electric pump is driven by the traction motor.

In the motor transmission apparatus according to the present invention, the first and second power transmission paths are formed by a single planetary gear train.

According to the present invention, working oil is distributed to one of the first engagement mechanism and the second engagement mechanism by the oil passage switching valve, and therefore interlocking, in which the first engagement mechanism and the second engagement mechanism are both engaged, can be avoided. Further, the output control valve is provided on an upstream side of the oil passage switching valve, and therefore the output control valve can be switched to the blocking condition even when Control of the oil passage switching valve becomes impossible. As a result, over-speeding can be prevented from occurring in the traction motor, and therefore an electric system can be protected.

DESCRIPTION OF THE PREFERRED EMBODIMENTS

Figure 1:
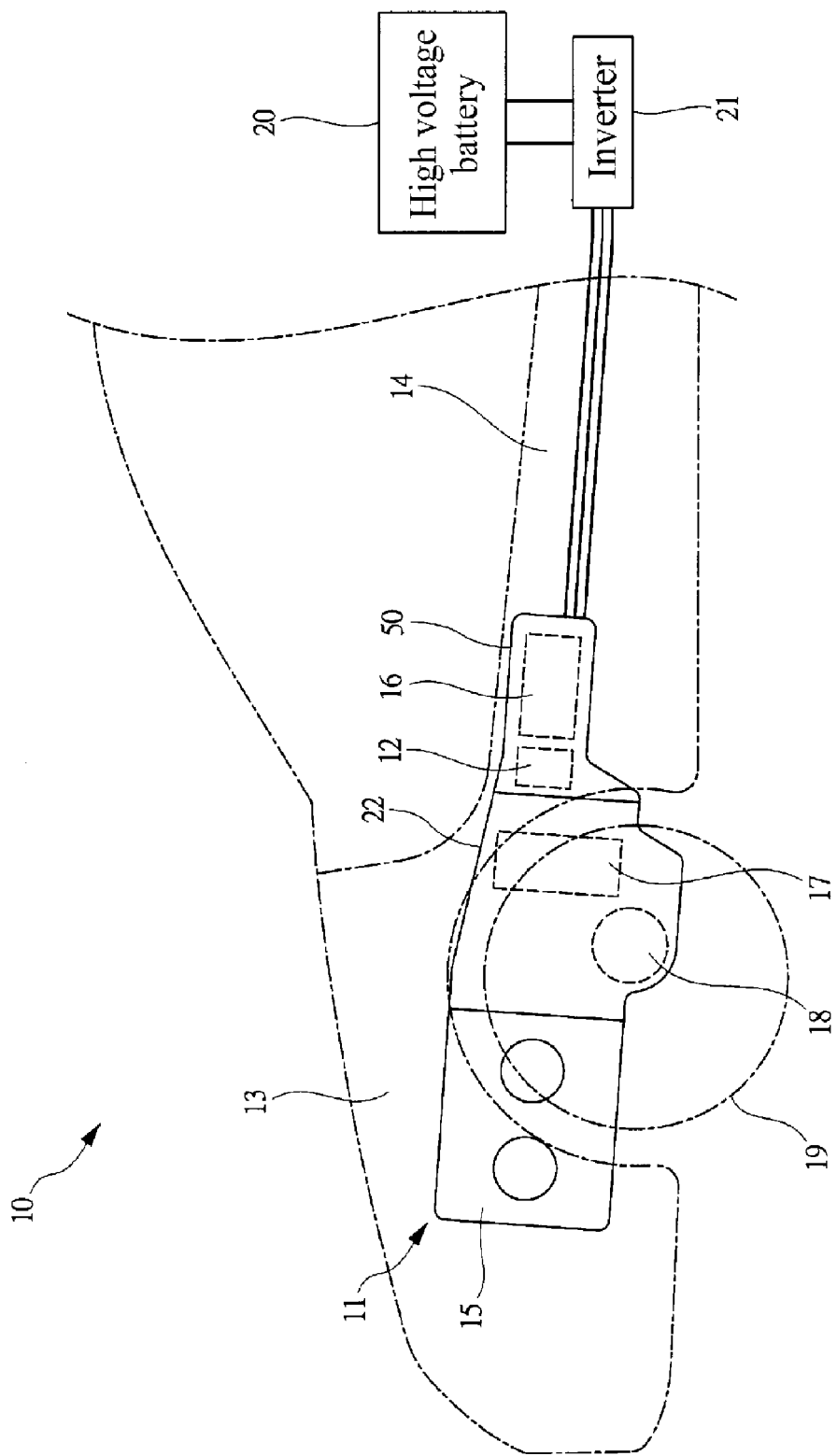
FIG. 1 is a schematic diagram showing a hybrid vehicle.
Figure 2:
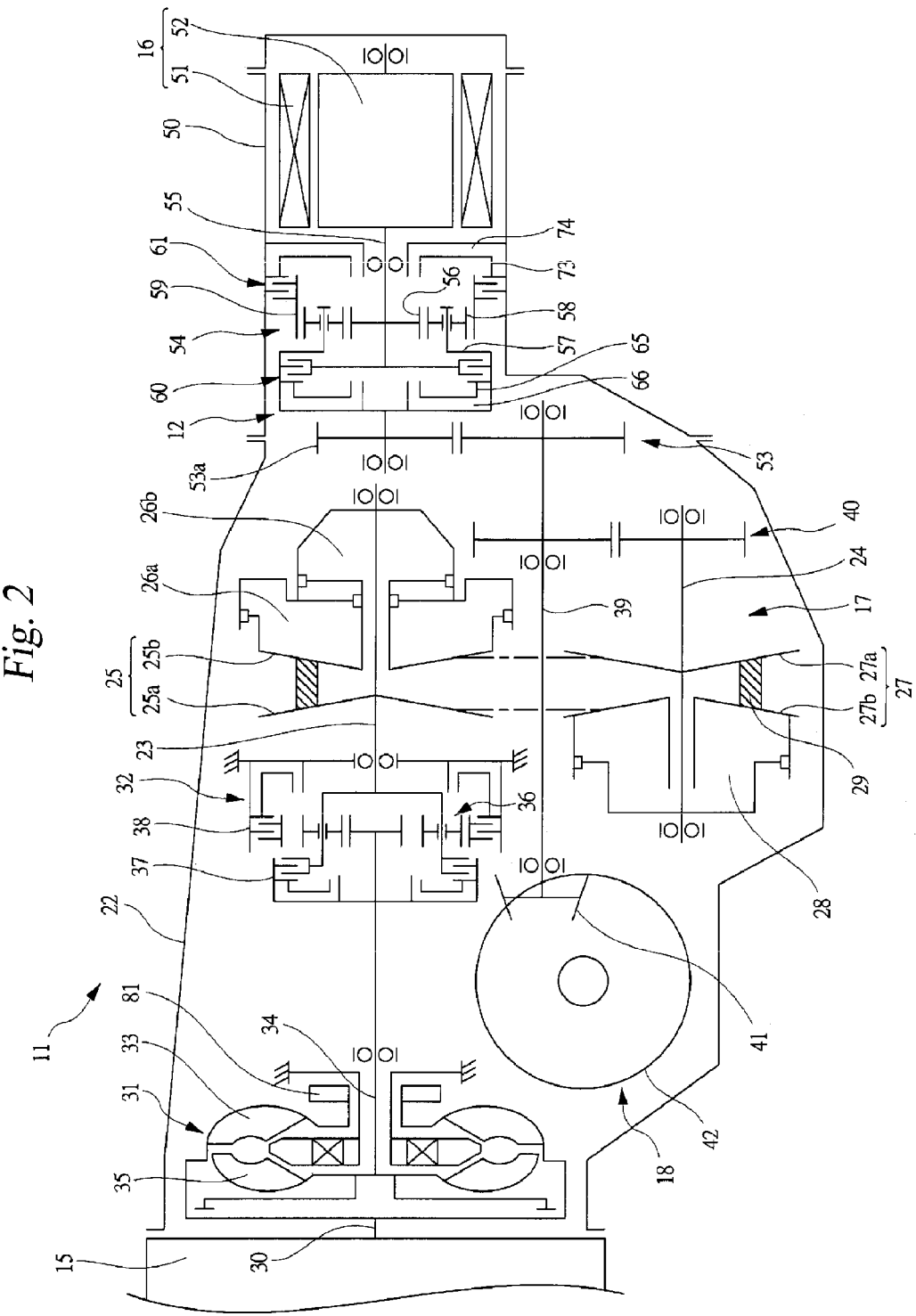
FIG. 2 is a skeleton diagram showing an internal structure of a power unit installed in the hybrid vehicle.

Embodiments of the present invention will be described in detail below on the basis of the drawings. FIG. 1 is a schematic diagram showing a hybrid vehicle 10. FIG. 2 is a skeleton diagram showing an internal structure of a power unit 11 installed in the hybrid vehicle 10. A motor transmission apparatus 12 according to an embodiment of the present invention is incorporated into the power unit 11.

As shown in FIG. 1, the power unit 11 is installed longitudinally in a vehicle body from an engine room 13 to a floor tunnel 14. An engine 15 is incorporated into one end portion of the power unit 11, and a motor/generator (traction motor) 16 is incorporated into another end portion of the power unit 11. A continuously variable transmission 17, a differential mechanism 18, and so on are incorporated into the power unit 11 such that engine power and motor power are transmitted to a drive wheel 19 from the differential mechanism 18. Further, an inverter 21 is provided between a high voltage battery 20 and the motor/generator 16, which serves as an alternating current motor, in order to supply electric power to the motor/generator 16. The inverter 21 is constituted by a switching element or the like, and direct current power from the high voltage battery 20 is converted into alternating current power for the motor/generator 16 via the inverter 21. Note that when the motor/generator 16 is used as a generator, alternating current power from the motor/generator 16 is converted into direct current power for the high voltage battery 20 via the inverter 21.

As shown in FIG. 2, a mission case 22 is attached to the engine 15, and the continuously variable transmission 17 is housed in the mission case 22. The continuously variable transmission 17 includes a primary shaft 23 driven by the engine 15 and a secondary shaft 24 that is parallel to the primary shaft 23. A primary pulley 25 is provided on the primary shaft 23, and the primary pulley 25 includes a fixed sheave 25a and a movable sheave 25b. Working oil chambers 26a, 26b are defined on a back surface side of the movable sheave 25b, and by regulating a pressure in the working oil chambers 26a and 26b, a pulley groove width can be varied. A secondary pulley 27 is provided on the secondary shaft 24, and the secondary pulley 27 includes a fixed sheave 27a and a movable sheave 27b. A working oil chamber 28 is defined on a back surface side of the movable sheave 27b, and by regulating a pressure in the working oil chamber 28, a pulley groove width can be varied. Further, a drive chain 29 is wound around the primary pulley 25 and the secondary pulley 27. By varying the groove width of the pulleys 25 and 27 to vary a winding diameter of the drive chain 29, the primary shaft 23 can be shifted continuously relative to the secondary shaft 24.

A torque converter 31 and a forward/reverse switching mechanism 32 are provided between a crankshaft 30 and the primary shaft 23 in order to transmit the engine power to the continuously variable transmission 17. The torque converter 31 includes a pump impeller 33 coupled to the crankshaft 30, and a turbine runner 35 that is disposed opposite the pump impeller 33 and coupled to a turbine shaft 34. The forward/reverse switching mechanism 32 includes a double pinion type planetary gear train 36, a forward clutch 37, and a reverse brake 38. By controlling the forward clutch 37 and the reverse brake 38, an engine power transmission path can be switched, and as a result, a rotation direction of the primary shaft 23 can be switched. Further, a transmission output shaft 39 is housed in the mission case 22 parallel to the secondary shaft 24 as a drive shaft, and the transmission output shaft 39 is coupled to the secondary shaft 24 via a gear train 40. Furthermore, a pinion gear 41 is fixed to an end portion of the transmission output shaft 39, and the pinion gear 41 is meshed to a ring gear 42 of the differential mechanism 18. Hence, the continuously variable transmission 17 and the differential mechanism 18 are coupled via the transmission output shaft 39 such that the engine power output from the continuously variable transmission 17 is transmitted to the differential mechanism 18 via the transmission output shaft 39.

Further, a motor case 50 is attached to the mission case 22, and the motor/generator 16 is housed in the motor case 50. The motor/generator 16 includes a stator 51 fixed to the motor case 50 and a rotor 52 accommodated on an inner side of the stator 51 to be free to rotate. The motor transmission apparatus 12 and a gear train 53 are provided between the motor/generator 16 and the transmission output shaft 39 such that the motor power is transmitted to the drive wheel 19 via the motor transmission apparatus 12 and the gear train 53. The motor transmission apparatus 12 includes a planetary gear train 54, and the planetary gear train 54 is constituted by a sun gear 56 coupled to a motor shaft 55 that extends from the rotor 52, a carrier 57 coupled to the transmission output shaft 39 via the gear train 53, and a ring gear 59 meshed to a pinion gear 58 of the carrier 57. Note that the pinion gear 58 of the carrier 57 is meshed to the sun gear 56 as well as the ring gear 59. Further, a high clutch 60 serving as the first engagement mechanism that can be switched between an engaged condition and a disengaged condition is provided between the sun gear 56 and the carrier 57. Furthermore, a low brake 61 serving as the second engagement mechanism that can be switched between an engaged condition and a disengaged condition is provided between the ring gear 59 and the motor case 50.

Figure 3:
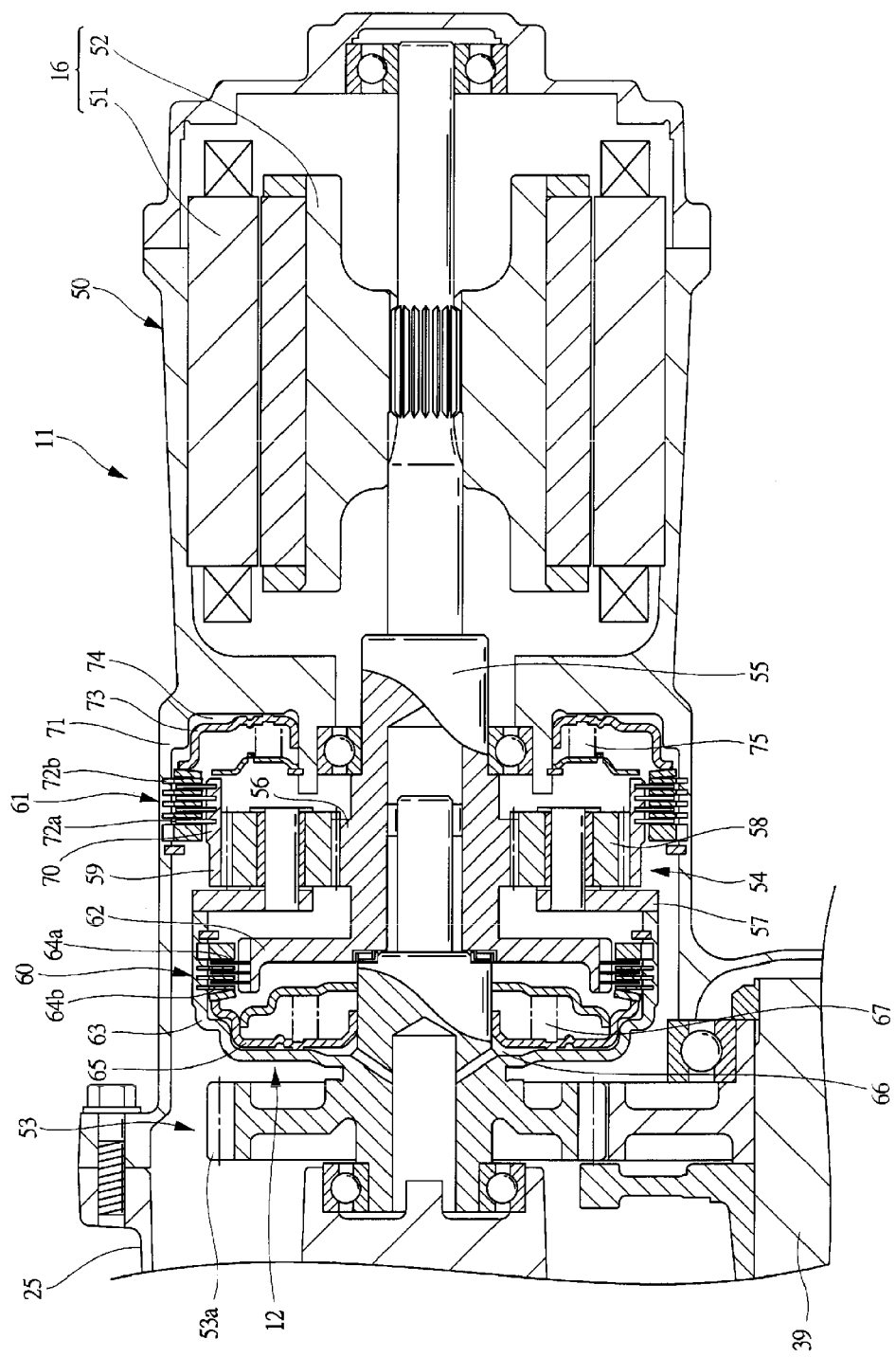
FIG. 3 is an enlarged sectional view of a motor transmission apparatus provided in the power unit.

FIG. 3 is an enlarged sectional view of the motor transmission apparatus 12 provided in the power unit 11. As shown in FIG. 3, the high clutch 60 provided in the motor transmission apparatus 12 includes a clutch hub 62 fixed to the motor shaft 55, and a clutch drum 63 coupled to a drive gear 53a of the gear train 53. A plurality of friction plates 64a are attached to the clutch hub 62, and a plurality of friction plates 64b are attached to the clutch drum 63. Further, a piston member 65 is housed in the clutch drum 63, and a clutch oil chamber 66 is defined by the clutch drum 63 and the piston member 65. When working oil is supplied to the clutch oil chamber 66, the piston member 65 is pushed out by oil pressure, and as a result, the friction plates 64a and 64b are pushed against each other such that the high clutch 60 is switched to the engaged condition. When the working oil is discharged from the clutch oil chamber 66, on the other hand, the piston member 65 is pushed back by a spring member 67, and therefore the engagement between the friction plates 64a and 64b is released such that the high clutch 60 is switched to the disengaged condition. By switching the high clutch 60 to the engaged condition in this manner, the carrier 57 and the sun gear 56 can be caused to rotate integrally, and thus a carrier rotation speed can be aligned with a motor rotation speed. In other words, by switching the high clutch 60 to the engaged condition, the first power transmission path for transmitting the motor power from the sun gear 56 to the carrier 57 via the high clutch 60 is switched to a power transmission condition.

The low brake 61 provided in the motor transmission apparatus 12 includes a brake hub 70 provided on the ring gear 59 and a brake drum 71 provided in the motor case 50. A plurality of friction plates 72a are attached to the brake hub 70, and a plurality of friction plates 72b are attached to the brake drum 71. Further, a piston member 73 is housed in the brake drum 71, and a brake oil chamber 74 is defined by the brake drum 71 and the piston member 73. When working oil is supplied to the brake oil chamber 74, the piston member 73 is pushed out by oil pressure, and as a result, the friction plates 72a and 72b are pushed against each other such that the low brake 61 is switched to the engaged condition. When the working oil is discharged from the brake oil chamber 74, on the other hand, the piston member 73 is pushed back by a spring member 75, and therefore the engagement between the friction plates 72a and 72b is released such that the low brake 61 is switched to the disengaged condition. By switching the low brake 61 to the engaged condition in this manner, the ring gear 59 is fixed to the motor case 50, and thus the motor rotation speed can be increased beyond the carrier rotation speed. In other words, by switching the low brake 61 to the engaged condition, the second power transmission path for transmitting the motor power from the sun gear 56 to the carrier 57 via the pinion gear 58 is switched to a power transmission condition.

As described above, by engaging the low brake 61 and disengaging the high clutch 60, the ring gear 59 is fixed to the motor case 50, and therefore the motor rotation speed can be increased beyond the carrier rotation speed. On the other hand, by engaging the high clutch 60 and disengaging the low brake 61, the carrier 57 can be caused to rotate integrally with the sun gear 56, and therefore the carrier rotation speed can be aligned with the motor rotation speed. By controlling the motor transmission apparatus 12 in this manner, the motor rotation speed can be shifted in two stages, and therefore an upper limit rotation speed of the motor/generator 16 can be reduced. In other words, at low speeds, the low brake 61 is engaged and the high clutch 60 is disengaged, whereas at high speeds, the high clutch 60 is engaged and the low brake 61 is disengaged. Note that the motor/generator 16 can be decoupled from the transmission output shaft 39 at high speeds by disengaging both the high clutch 60 and the low brake 61.

Figure 4:
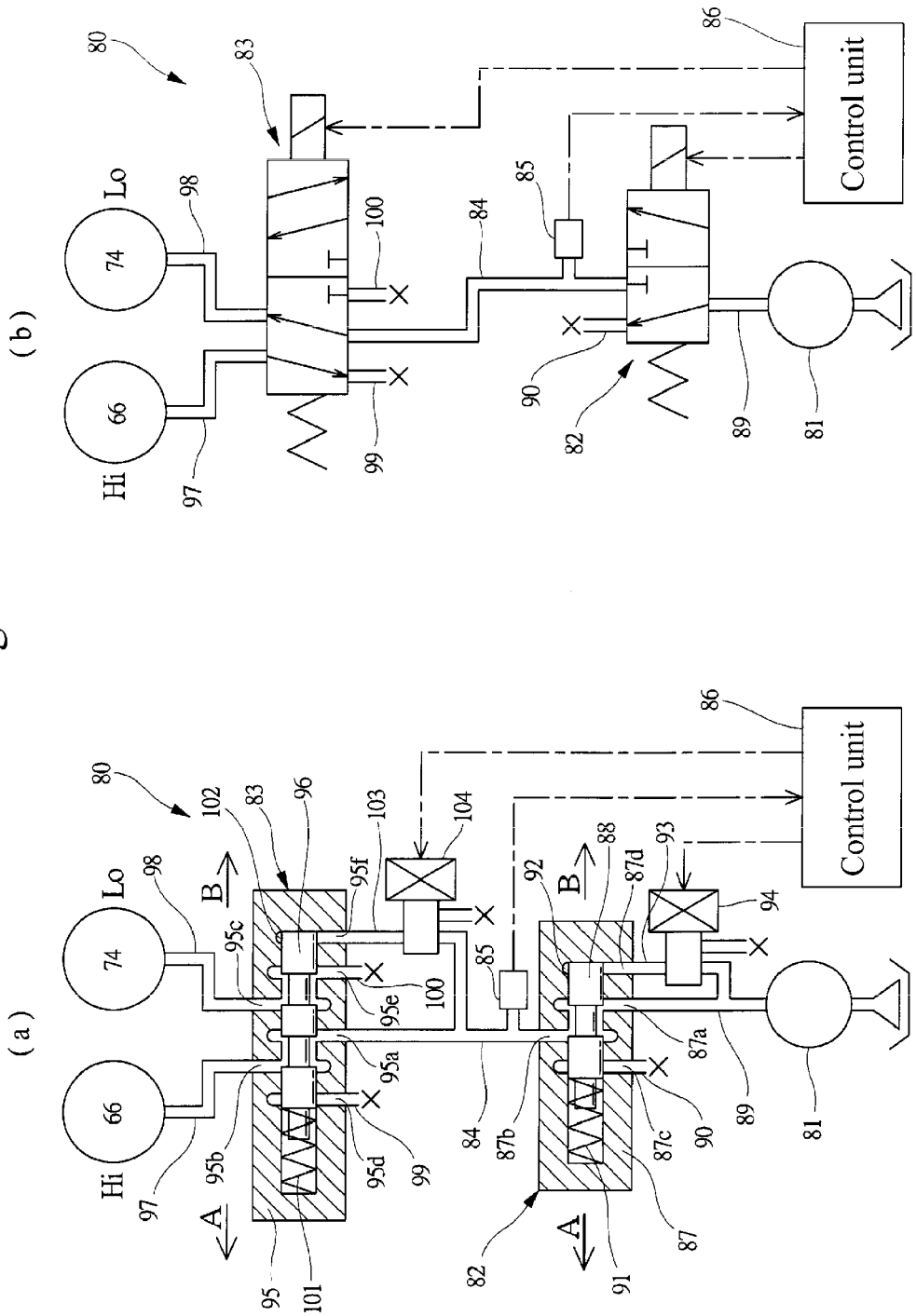
FIG. 4A is a circuit diagram showing a hydraulic control circuit provided in the motor transmission apparatus.
FIG. 4B is a simplified circuit diagram of the hydraulic control circuit.

Incidentally, if both the high clutch 60 and the low brake 61 are engaged, power transmission paths having different gear ratios are set in the power transmission condition simultaneously, and as a result, the transmission output shaft 39 and the motor shaft 55 is caused to stop rotating suddenly. To avoid this interlocking, a hydraulic control circuit 80 is provided to ensure that working oil is not supplied to the high clutch 60 and the low brake 61 simultaneously. FIG. 4A is a circuit diagram showing the hydraulic control circuit 80 provided in the motor transmission apparatus 12, and FIG. 4B is a simplified circuit diagram of the hydraulic control circuit 80.

As shown in FIGS. 4A and 4B, an output control valve 82 is provided between an oil pump 81, which serves as the oil pressure supply source driven by the engine 15, and the clutch oil chamber 66 and brake oil chamber 74. The output control valve 82 can be switched between a communicative condition in which working oil from the oil pump 81 is allowed to pass through the output control valve 82, and a blocking condition in which passage of the working oil from the oil pump 81 is blocked. Further, an oil passage switching valve 83 is provided between the output control valve 82 and the clutch oil chamber 66 and brake oil chamber 74. The oil passage switching valve 83 can be switched between a clutch engagement condition in which working oil from the output control valve 82 is guided to the clutch oil chamber 66, and a brake engagement condition in which the working oil from the output control valve 82 is guided to the brake oil chamber 74. Furthermore, an oil pressure sensor 85 is provided in a supply oil passage for guiding the working oil from the output control valve 82 to the oil passage switching valve 83, and an oil pressure signal is output from the oil pressure sensor 85 to a control unit 86.

The output control valve 82 includes a housing 87 and a spool valve shaft 88 housed in the housing 87 to be free to move. An input port 87a, an output port 87b, and a discharge port 87c are formed in the housing 87. A supply oil passage 89 extending from the oil pump 81 is connected to the input port 87a, a supply oil passage 84 heading toward the oil passage switching valve 83 is connected to the output port 87b, and a discharge oil passage 90 is connected to the discharge port 87c. Further, a spring member 91 is incorporated into one end side of the spool valve shaft 88 of the output control valve 82 in order to operate the spool valve shaft 88, and a pilot pressure chamber 92 is formed on another end side of the spool valve shaft 88. A pilot port 87d that communicates with the pilot pressure chamber 92 is formed in the housing 87, and a pilot pressure passage 93 is connected to the pilot port 87d. A solenoid valve 94 controlled by the control unit 86 is connected to the pilot pressure passage 93, and a control pressure regulated by the solenoid valve 94 is supplied to the pilot pressure chamber 92. When working oil is supplied to the pilot pressure chamber 92, the spool valve shaft 88 moves in the direction of an arrow A against a spring force, and as a result, the output control valve 82 is switched to a blocking condition in which the input port 87a and the output port 87b are blocked. When the working oil is discharged from the pilot pressure chamber 92, on the other hand, the spool valve shaft 88 is moved in the direction of an arrow B by the spring force, and as a result, the output control valve 82 is switched to a communicative condition in which the input port 87a and the output port 87b communicate with each other.

Further, the oil passage switching valve 83 includes a housing 95 and a spool valve shaft 96 housed in the housing 95 to be free to move. An input port 95a is formed in the housing 95, and the supply oil passage 84 extending from the output control valve 82 is connected to the input port 95a. Further, a pair of output ports 95b and 95c are formed in the housing 95. A clutch oil passage 97 that communicates with the clutch oil chamber 66 is connected to one of the output ports 95b and a brake oil passage 98 that communicates with the brake oil chamber 74 is connected to the other output port 95c. Furthermore, a pair of discharge ports 95d and 95e are formed in the housing 95, and discharge oil passages 99 and 100 are connected to the respective discharge ports 95d and 95e. A spring member 101 is incorporated into one end side of the spool valve shaft 96 of the output control valve 82 in order to operate the spool valve shaft 96, and a pilot pressure chamber 102 is formed on another end side of the spool valve shaft 96. A pilot port 95f that communicates with the pilot pressure chamber 102 is formed in the housing 95, and a pilot pressure passage 103 is connected to the pilot port 95f. A solenoid valve 104 controlled by the control unit 86 is connected to the pilot pressure passage 103, and a control pressure regulated by the solenoid valve 104 is supplied to the pilot pressure chamber 102. When working oil is supplied to the pilot pressure chamber 102, the spool valve shaft 96 moves in the direction of the arrow A against a spring force, and as a result, the oil passage switching valve 83 is switched to a brake engagement condition in which, the input port 95a communicates with the output port 95c. When the working oil is discharged from the pilot pressure chamber 102, on the other hand, the spool valve shaft 96 is moved in the direction of the arrow B by the spring force, and as a result, the oil passage switching valve 83 is switched to a clutch engagement condition in which the input port 95a communicates with the output port 95b.

Figure 5:
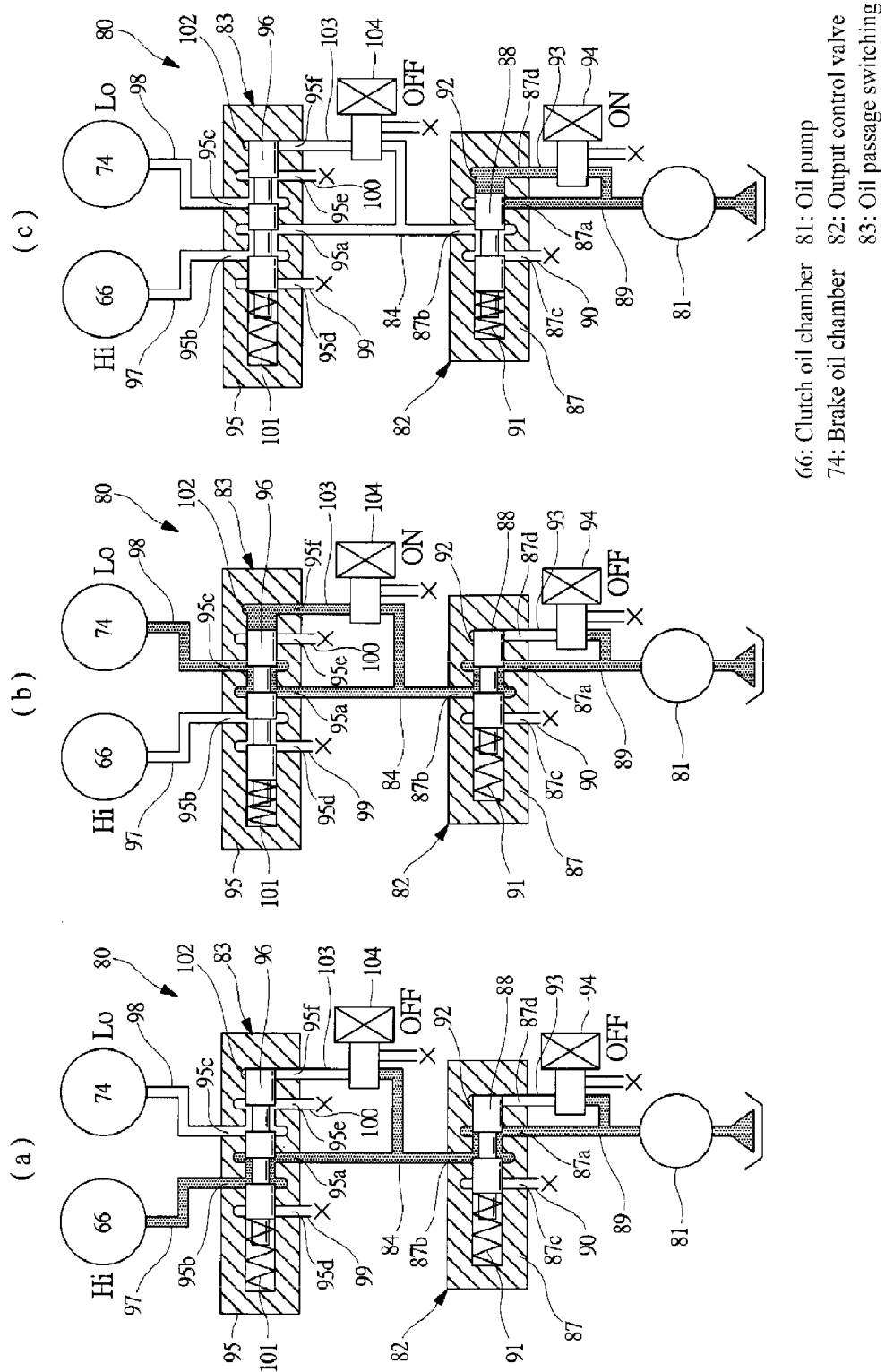
FIG. 5A is a circuit diagram showing an operating condition in which a high clutch is engaged and a low brake is disengaged.
FIG. 5B is a circuit diagram showing an operating condition in which the low brake is engaged and the high clutch is disengaged.
FIG. 5C is a circuit diagram showing an operating condition in which both the high clutch and the low brake are disengaged.

Next, operating conditions of the hydraulic control circuit 80 will be described. FIG. 5A is a circuit diagram showing an operating condition in which the high clutch 60 is engaged and the low brake 61 is disengaged, FIG. 5B is a circuit diagram showing an operating condition in which the low brake 61 is engaged and the high clutch 60 is disengaged, and FIG. 5C is a circuit diagram showing an operating condition in which both the high clutch 60 and the low brake 61 are disengaged.

As shown in FIG. 5A, when the high clutch 60 is engaged and the low brake 61 is disengaged, the pilot pressure supplied to the output control valve 82 from the solenoid valve 94 is blocked, and therefore the output control valve 82 is switched to the communicative condition. Further, the pilot pressure supplied to the oil passage switching valve 83 from the solenoid valve 104 is blocked, and therefore the oil passage switching valve 83 is switched to the clutch engagement condition in which working oil is guided to the clutch oil chamber 66. Hence, the working oil discharged from the oil pump 81 is guided to the clutch oil chamber 66 from the output control valve 82 via the oil passage switching valve 83, whereby the high clutch 60 is switched to the engaged condition. At this time, the oil passage switching valve 83 connects the brake oil passage 98 to the discharge oil passage 100, and therefore the working oil in the brake oil chamber 74 is discharged via the oil passage switching valve 83 such that the low brake 61 is reliably maintained in the disengaged condition.

As shown in FIG. 5B, when the low brake 61 is engaged and the high clutch 60 is disengaged, the pilot pressure supplied to the output control valve 82 from the solenoid valve 94 is blocked such that the output control valve 82 is switched to the communicative condition. Further, pilot pressure is supplied to the oil passage switching valve 83 from the solenoid valve 104, and therefore the oil passage switching valve 83 is switched to the brake engagement condition in which working oil is guided to the brake oil chamber 74. Hence, the working oil discharged from the oil pump 81 is guided to the brake oil chamber 74 from the output control valve 82 via the oil passage switching valve 83, and as a result, the low brake 61 is switched to the engaged condition. At this time, the oil passage switching valve 83 connects the clutch oil passage 97 to the discharge oil passage 99, and therefore the working oil in the clutch oil chamber 66 is discharged via the oil passage switching valve 83 such that the high clutch 60 is reliably maintained in the disengaged condition.

Furthermore, as shown in FIG. 5C, when both the high clutch 60 and the low brake 61 are disengaged, pilot pressure is supplied to the output control valve 82 from the solenoid valve 94 such that the output control valve 82 is switched to the blocking condition. As a result, the working oil from the oil pump 81 is blocked by the output control valve 82, and therefore the working oil supply to both the clutch oil chamber 66 and the brake oil chamber 74 can be blocked. At this time, the output control valve 82 connects the supply oil passage 84 to the discharge oil passage 90, and therefore both the high clutch 60 and the low brake 61 can be reliably maintained in the disengaged condition regardless of the operating condition of the oil passage switching valve 83. In other words, in the case shown in the drawing, the brake oil passage 98 and the discharge oil passage 100 communicate with each other via the oil passage switching valve 83, and therefore the working oil in the brake oil chamber 74 is discharged via the oil passage switching valve 83. Meanwhile, the clutch oil passage 97 and the supply oil passage 84 communicate with each other via the oil passage switching valve 83, and therefore the working oil in the clutch oil chamber 66 is guided to the output control valve 82 via the oil passage switching valve 83. However, the output control valve 82 connects the supply oil passage 84 to the discharge oil passage 90, and therefore the working oil in the clutch oil chamber 66 is discharged from the oil passage switching valve 83 via the output control valve 82. Hence, the high clutch 60 can also be reliably switched to the disengaged condition.

As described above, working oil is distributed to one of the clutch oil chamber 66 and the brake oil chamber 74 by the oil passage switching valve 83, and therefore working oil is never supplied to both the clutch oil chamber 66 and the brake oil chamber 74. Hence, interlocking can be prevented reliably.

Further, the output control valve 82 is provided on an upstream side of the oil passage switching valve 83, and therefore, even in a case where control of the oil passage switching valve 83 becomes impossible while the oil passage switching valve 83 is in the brake engagement condition, the low brake 61 can be disengaged by switching the output control valve 82 to the blocking condition, and as a result, over-speeding can be prevented from occurring in the motor/generator 16. In other words, the low brake 61 can be reliably disengaged even when a powering fault occurs in the solenoid valve 104 for controlling the oil passage switching valve 83 (such that the solenoid valve 104 is constantly ON) or the oil passage switching valve 83 becomes stuck in the brake engagement condition due to inserted foreign matter or the like, and therefore the motor/generator 16 can be prevented from over-speeding during high-speed travel. As a result, a malfunction in the inverter 21 caused by an excessive induced voltage from the motor/generator 16 can be avoided.

Further, even in a case where control of the output control valve 82 becomes impossible while the output, control valve 82 is in the communicative condition, the low brake 61 can be disengaged by switching the oil passage switching valve 83 to the clutch engagement condition, and as a result, over-speeding can be prevented from occurring in the motor/generator 16. In other words, the low brake 61 can be disengaged reliably even when a ground fault occurs in the solenoid valve 94 for controlling the output control valve 82 (such that the solenoid valve 94 is constantly OFF) or the output control valve 82 becomes stuck in the communicative condition due to inserted foreign matter or the like, and therefore the motor/generator 16 can be prevented from over-speeding during high-speed travel. As a result, a malfunction in the inverter 21 caused by an excessive induced voltage from the motor/generator 16 can be avoided. Note that a malfunction in the output control valve 82 is detected by comparing a control signal relating to the solenoid valve 94 with the oil pressure signal from the oil pressure sensor 85.

Figure 6:
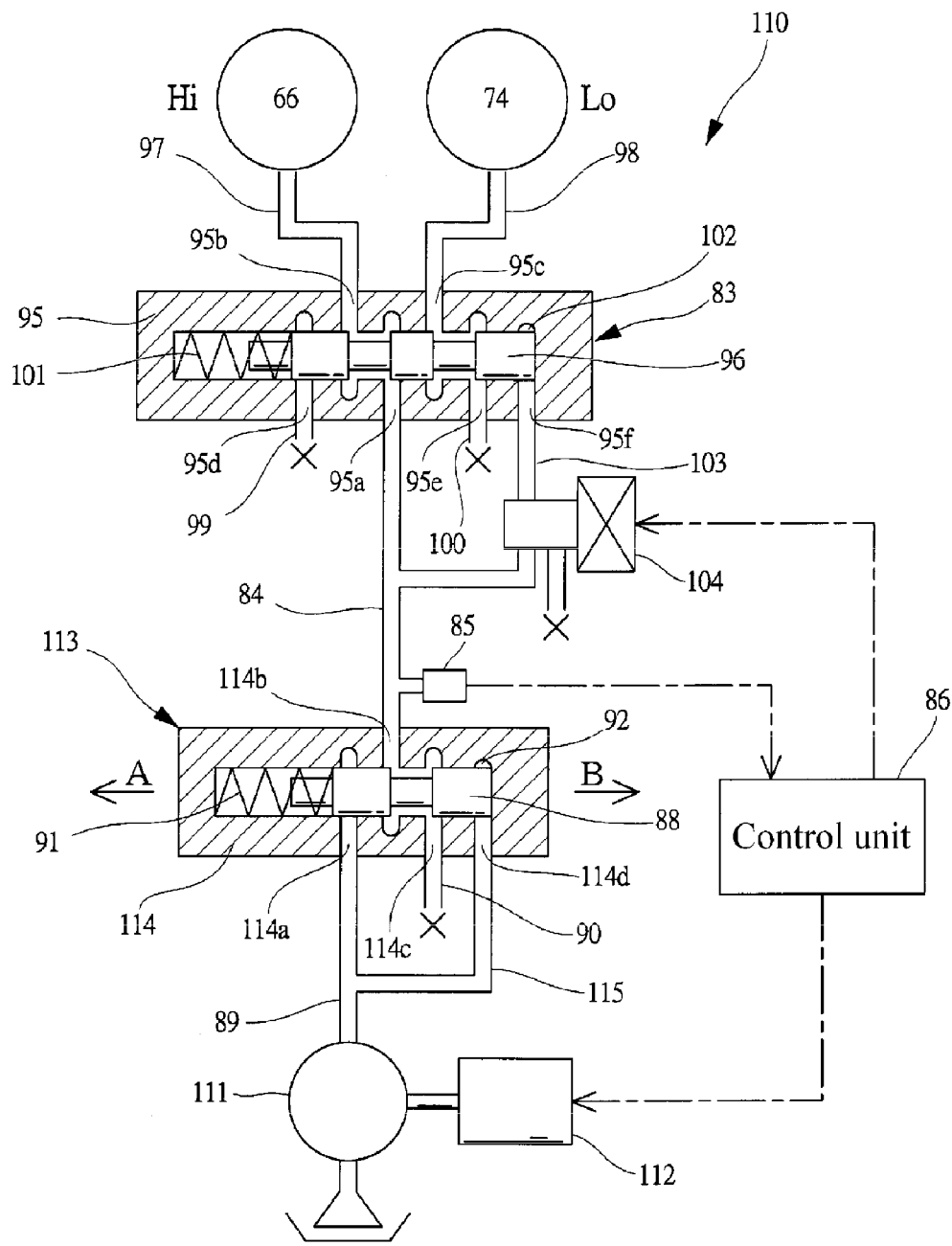
FIG. 6 is a circuit diagram showing a hydraulic control circuit provided in a motor transmission apparatus according to another embodiment of the present invention.

In the hydraulic control circuit 80 described above, the output control valve 82 is switched by the pilot pressure from the solenoid valve 94, but the present invention is not limited thereto, and the output control valve 82 may be switched by the working oil discharged from the oil pump 81. FIG. 6 is a circuit diagram showing a hydraulic control circuit 110 provided in a motor transmission apparatus according to another embodiment of the present invention. Note that similar members to the members shown in FIG. 4 have been allocated identical reference symbols and description thereof has been omitted.

As shown in FIG. 6, an electric motor 112 is incorporated into an oil pump 111 serving as the oil pressure supply source, whereby the oil pump 111 functions as the electric pump driven by the electric motor 112. Further, an output control valve 113 provided between the oil pump 111 and the oil passage switching valve 83 includes a housing 114 and the spool valve shaft 88, which is housed in the housing 114 to be free to move. An input port 114a, an output port 114b, and a discharge port 114c are formed in the housing 114. The supply oil passage 89 extending from the oil pump 111 is connected to the input port 114a, the supply oil passage 84 heading toward the oil passage switching valve 83 is connected to the output port 114b, and the discharge oil passage 90 is connected to the discharge port 114c. Further, a pilot port 114d that communicates with the pilot pressure chamber 92 is formed in the housing 114, and a pilot pressure passage 115 that bifurcates from the supply oil passage 89 is connected to the pilot port 114d. When working oil is supplied to the pilot pressure chamber 92, the spool valve shaft 88 moves in the direction of an arrow A against the spring force, and as a result, the output control valve 82 is switched to a communicative condition in which the input port 114a and the output port 114b communicate with each other. When the working oil is discharged from the pilot pressure chamber 92, on the other hand, the spool valve shaft 88 is moved in the direction of an arrow B by the spring force, and as a result, the output control valve 113 is switched to a blocking condition in which the input port 114a and the output port 114b are blocked.

With this constitution, working oil is supplied to the pilot pressure chamber 92 from the oil pump 111 when the electric motor 112 is driven, and as a result, the output control valve 113 is switched to the communicative condition. When driving of the electric motor 112 is stopped, on the other hand, the supply of working oil from the oil pump 111 to the pilot pressure chamber 92 is halted, and therefore the output control valve 113 is switched to the blocking condition. Hence, the output control valve 113 can be switched in conjunction with a driving condition of the electric motor 112, and therefore the solenoid valve 94 described above can be omitted, enabling simplification of the hydraulic control circuit 110.

Figure 7:
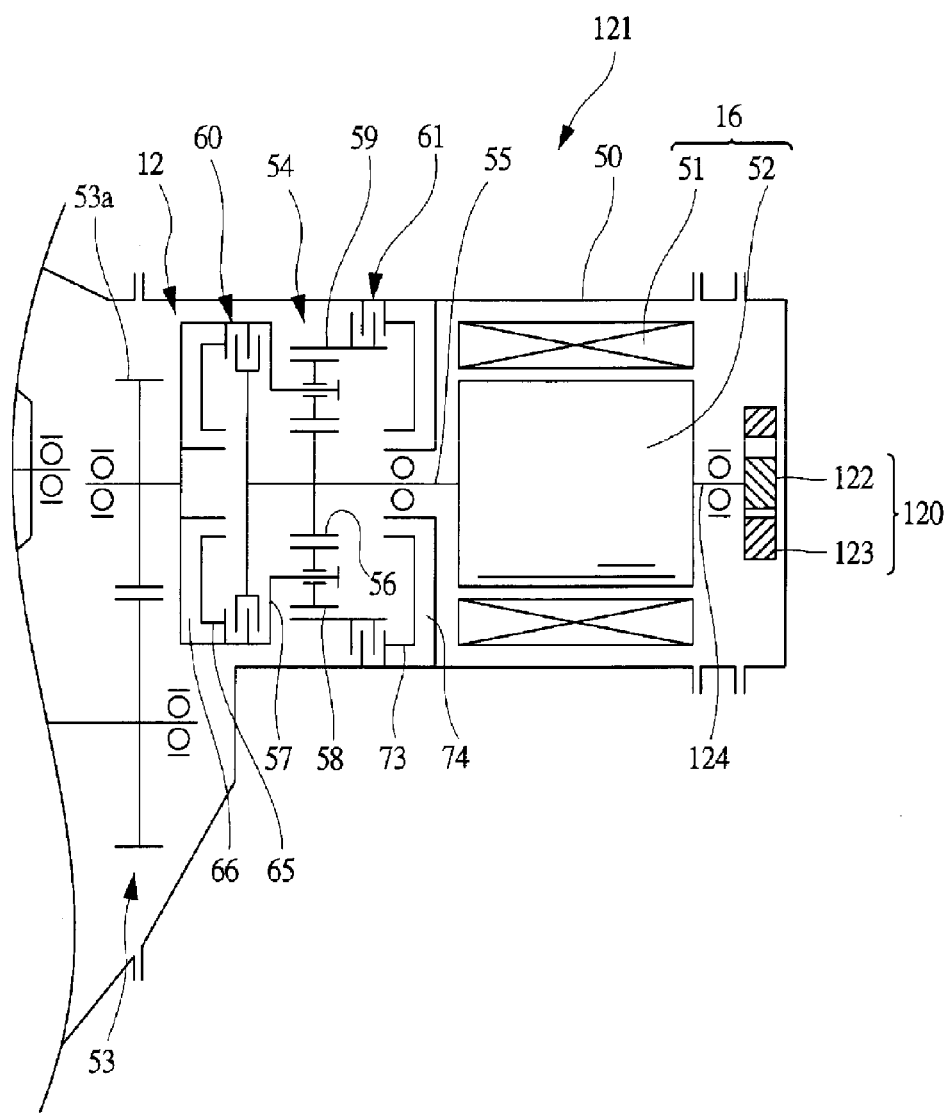
FIG. 7 is a partial skeleton diagram showing a power unit having an oil pump that is driven by a motor/generator.

Further, the hydraulic control circuit 110 shown in FIG. 6 includes the electric motor 112 for driving the oil pump 111, but the present invention is not limited thereto, and the oil pump 111 may be driven using the motor/generator 16. FIG. 7 is a partial skeleton diagram showing a power unit 121 having an oil pump 120 that is driven by the motor/generator 16. Note that similar members to the members shown in FIG. 1 have been allocated identical reference symbols and description thereof has been omitted. As shown in FIG. 7, the oil pump 120 serving as the oil pressure supply source is provided adjacent to the motor/generator 16 in a rear end portion of the power unit 121. The oil pump 120 includes an outer rotor 122 and an inner rotor 123, and a pump driving shaft 124 extending from the rotor 52 of the motor/generator 16 is coupled to the inner rotor 123. When the oil pump 120 driven by the motor/generator 16 is provided in this manner, the specialized electric motor 112 for driving the oil pump is not required, and therefore the hydraulic control circuit 110 can be simplified. Note that an external gear type oil pump, for example, may be used as the oil pump 120.

Figure 8:
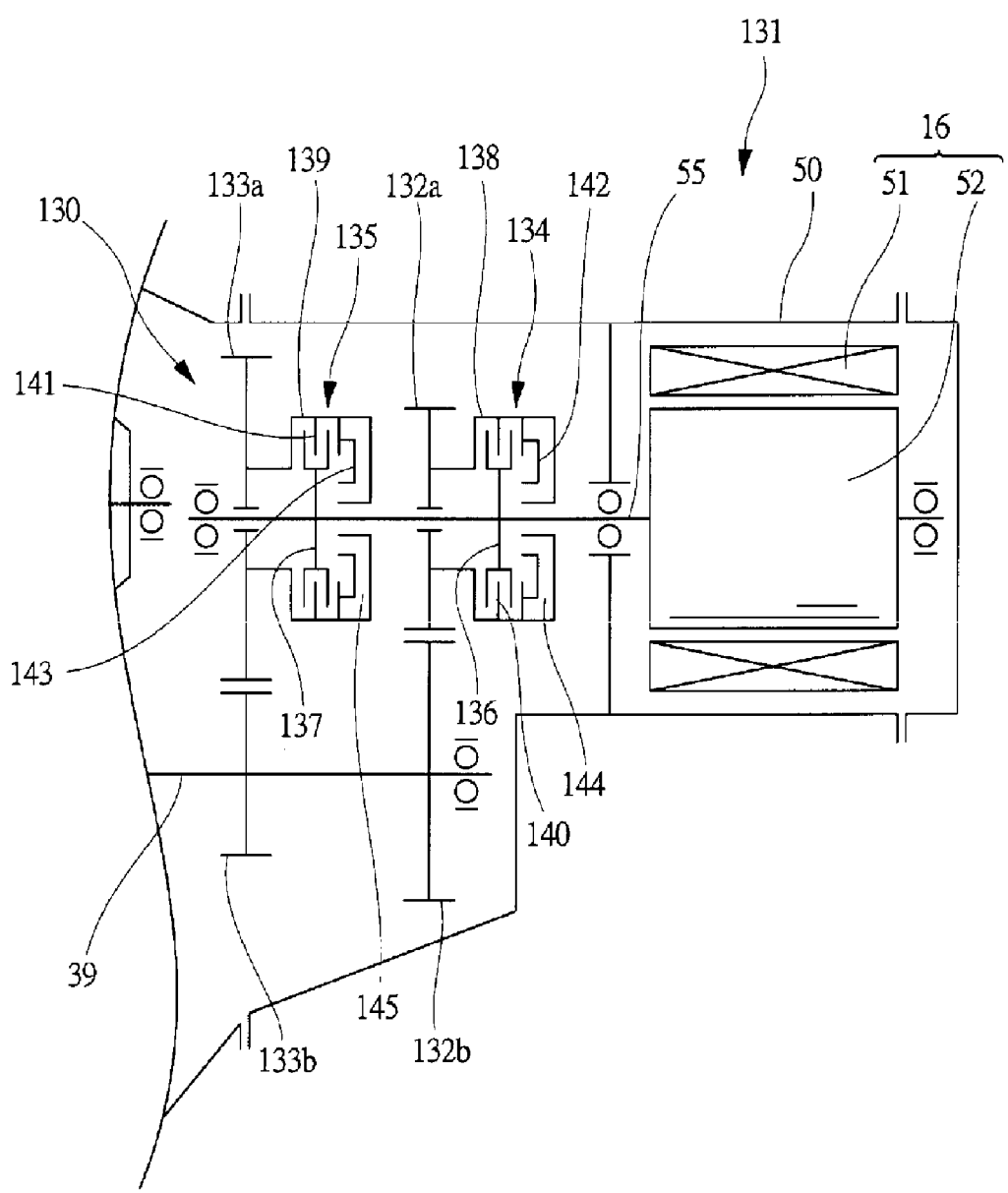
FIG. 8 is a partial skeleton diagram showing a power unit provided with a motor transmission apparatus according to another embodiment of the present invention.

Further, the motor transmission apparatus 12 shown in the drawings is constituted by the planetary gear train 54, but the present invention is not limited thereto, and the motor transmission apparatus 12 may be constituted by a parallel shaft type transmission gear train. FIG. 8 is a partial skeleton diagram showing a power unit 131 provided with a motor transmission apparatus 130 according to another embodiment of the present invention. Note that similar members to the members shown in FIG. 1 have been allocated identical reference symbols and description thereof has been omitted. As shown in FIG. 8, two drive gears 132a and 133a are provided on the motor shaft 55 to be free to rotate, and two driven gears 132b and 133b that mesh with the drive gears 132a and 133a are fixed to the transmission output shaft 39. Further, a high clutch 134 serving as the first engagement mechanism that can be switched between an engaged condition and a disengaged condition is provided between the drive gear 132a and the motor shaft 55. Furthermore, a low clutch 135 serving as the second engagement mechanism that can be switched between an engaged condition and a disengaged condition is provided between the drive gear 133a and the motor shaft 55.

The high clutch 134 and the low clutch 135 include clutch hubs 136 and 137 fixed to the motor shaft 55 and clutch drums 138 and 139 coupled to the drive gears 132a and 133a. A plurality of friction plates 140 are attached between the clutch hub 136 and the clutch drum 138, and a plurality of friction plates 141 are attached between the clutch hub 137 and the clutch drum 139. Further, piston members 142 and 143 are housed in the clutch drums 138 and 139, and clutch oil chambers 144 and 145 are defined by the clutch drums 138 and 139 and the piston members 142 and 143. When working oil is supplied to the clutch oil chamber 144 such that the high clutch 134 is switched to the engaged condition, the first power transmission path for transmitting the motor power from the drive gear 132a to the driven gear 132b via the high clutch 134 is switched to a power transmission condition. Further, when working oil is supplied to the clutch oil chamber 145 such that the low clutch 135 is switched to the engaged condition, the second power transmission path for transmitting the motor power from the drive gear 133a to the driven gear 133b via the low clutch 135 is switched to a power transmission condition.

Hence, even when the motor transmission apparatus 130 is constituted by a parallel shaft type transmission gear train, similar effects to those of the motor transmission apparatus 12 described above can be obtained. Note that the case shown in the drawings employs the high clutch 134 and the low clutch 135, which are frictional engagement mechanisms, but the present invention is not limited thereto, and instead, a synchromesh mechanism for switching the transmission gear train to the power transmission condition may be provided and the synchromesh mechanism may be-driven by a hydraulic actuator.

The present invention is not limited to the embodiments described above and may be subjected to various modifications within a scope that does not depart from the spirit thereof. For example, in the above description, the present invention is applied to the hybrid vehicle 10, but the present invention may be applied to an electric automobile that uses only a traction motor as a power source.

What is claimed is:

1. A motor transmission apparatus provided between a drive shaft coupled to a drive wheel and a motor shaft coupled to a traction motor, the motor transmission apparatus comprising:

a first engagement mechanism for switching a first power transmission path provided between the drive shaft and the motor shaft between a power transmission condition and a power blocking condition;

a second engagement mechanism for switching a second power transmission path provided between the drive shaft and the motor shaft between a power transmission condition and a power blocking condition;

an output control valve that is provided between an oil pressure supply source and the first and second engagement mechanisms, and is switched between a communicative condition in which working oil from the oil pressure supply source is allowed to pass through the output control valve and a blocking condition in which the working oil from the oil pressure supply source is blocked; and an oil passage switching valve that is provided between the output control valve and the first and second engagement mechanisms, and is switched between a condition in which working oil from the output control valve is guided to the first engagement mechanism and a state in which the working oil from the output control valve is guided to the second engagement mechanism.

2. The motor transmission apparatus according to claim 1, wherein the oil passage switching valve is switched by a pilot pressure from a solenoid valve.

3. The motor transmission apparatus according to claim 1, wherein the output control valve is switched by a pilot pressure from a solenoid valve.

4. The motor transmission apparatus according to claim 1, wherein the oil pressure supply source is an electric pump, and the output control valve is switched by working oil from the electric pump.

5. The motor transmission apparatus according to claim 4, wherein the electric pump is driven by the traction motor.

6. The motor transmission apparatus according to claim 1, wherein the first and second power transmission paths are formed by a single planetary gear train.

7. The motor transmission apparatus according to claim 2, wherein the output control valve is switched by a pilot pressure from a solenoid valve.

8. The motor transmission apparatus according to claim 2, wherein the oil pressure supply source is an electric pump, and the output control valve is switched by working oil from the electric pump.

\* \* \* \* \*